US006322723B1

(12) United States Patent
Thomas

(10) Patent No.: US 6,322,723 B1
(45) Date of Patent: Nov. 27, 2001

(54) METHOD OF GENERATING HYDROGEN GAS

(75) Inventor: Stephen R. Thomas, Great Bend, KS (US)

(73) Assignee: Hydronics, L.L.C., Salina, KS (US)

( * ) Notice: Subject to any disclaimer, the term of this patent is extended or adjusted under 35 U.S.C. 154(b) by 0 days.

(21) Appl. No.: 09/620,401

(22) Filed: Jul. 20, 2000

Related U.S. Application Data

(60) Continuation of application No. 09/379,480, filed on Aug. 23, 1999, now Pat. No. 6,117,206, which is a division of application No. 09/093,280, filed on Jun. 8, 1998, now Pat. No. 6,018,091.

(51) Int. Cl.[7] .......... C01B 3/08; S62F 3/00; V09K 3/00; B09B 3/00

(52) U.S. Cl. .......... 252/188.25; 423/657; 423/658

(58) Field of Search .......... 252/188.25; 423/657, 423/658; 241/23; 149/108.2, 108.4

(56) References Cited

U.S. PATENT DOCUMENTS

| | | | | |
|---|---|---|---|---|
| 3,942,511 | * | 3/1976 | Black et al. | 252/188.25 |
| 3,957,483 | * | 5/1976 | Suzuki | 423/657 |
| 3,993,577 | * | 11/1976 | Black et al. | 423/657 |
| 4,017,414 | * | 4/1977 | Black et al. | 252/188.25 |
| 4,072,514 | * | 2/1978 | Suzuki | 423/657 |
| 4,264,362 | * | 4/1981 | Sergev et al. | 75/243 |
| 4,937,065 | * | 6/1990 | Maurer et al. | 427/654 |
| 5,879,378 | * | 3/1999 | Usui | 607/96 |
| 6,018,091 | * | 1/2000 | Thomas | 588/205 |
| 6,113,806 | * | 9/2000 | Thomas | 252/188.25 |
| 6,117,206 | * | 9/2000 | Thomas | 75/255 |
| 6,184,432 | * | 2/2001 | Thomas | 588/205 |

* cited by examiner

*Primary Examiner*—Joseph D. Anthony
(74) *Attorney, Agent, or Firm*—Hovey, Williams, Timmons & Collins

(57) ABSTRACT

The invention is concerned with a method of producing hydrogen gas. The method comprises the steps of: providing in a reaction container a composition including respective quantities of particulate elemental magnesium, particulate elemental iron, an additional elemental metal selected from the group consisting of particulate elemental aluminum and particulate elemental zinc at a level of from about 1–10% by weight, an alkali metal salt and water; causing said composition to react in said container to generate hydrogen gas; and recovering said evolved hydrogen gas.

9 Claims, No Drawings

METHOD OF GENERATING HYDROGEN GAS

RELATED APPLICATION

This is a continuation of application Ser. No. 09/379,480, filed Aug. 23, 1999, now U.S. Pat. No. 6,117,206 which is a division of application Ser. No. 09/093,280 filed Jun. 8, 1998, now U.S. Pat. No. 6,018,091, issued Jan. 25, 2000.

BACKGROUND OF THE INVENTION

1. Field of the Invention

The present invention is broadly concerned with improved methods and products for the thermal degradation of unwanted substances involving contacting such substances with a particulate metal composition in the presence of water and an alkali metal salt. More particularly, the invention pertains to such methods and products wherein the metallic compositions include respective quantities of particulate iron and magnesium, and preferably lesser amounts of particulate aluminum and zinc; such metal compositions can be used to thermally degrade materials such as agricultural manures to a small volume without any adverse environmental impact.

2. Description of the Prior Art

Agricultural areas involved in large-scale swine production face an increasingly difficult problem in disposing of swine manure and wastes. Indeed, in certain locales, government regulations are in place which severely limit the right of swine producers to dispose of such wastes in conventional ways; in some instances, these restrictions threaten to put such producers out of business or impose such costs as to make further production impractical.

There are a number of other industries that give rise to significant waste problems. Among these are packing house operations, oil refineries and the electrical utility industry because of the prior use of polychlorinated biphenols. Here again, these industries face evermore stringent environmental regulations making disposal problems a significant business issue.

Powdered metal compositions have been provided in the past for production of heat and hydrogen gas. For example, U.S. Pat. Nos. 4,017,414 and 3,993,577 describe iron and magnesium-containing compositions designed to generate relatively low temperatures with the evolution of hydrogen gas. The particular utility described in these references is that of replacing lost body heat for undersea divers or combat troops, or for heating machinery or instruments in remote or cold areas.

SUMMARY OF THE INVENTION

The present invention provides improved methods and products especially designed for the thermal degradation of unwanted substances such as manures, blood or blood-derived products, petroleum-based materials and other undesired chemicals such as polychlorinated biphenols. Broadly speaking, the method of the invention involves contacting such a substance with a particulate metal composition in the presence of water and an alkali metal salt, and causing sufficient heat to be generated during the contacting step to degrade the substance. The composition generally includes respective quantities of particulate iron and magnesium.

In preferred forms, the compositions include from about 10–50% by weight elemental particulate iron (more preferably from about 35–45% by weight) and from about 4–90% by weight elemental particulate magnesium (more preferably from about 10–25% by weight). Also, the compositions may include smaller amounts of particulate elemental aluminum and particulate elemental zinc, generally from about 0.1–25% by weight aluminum (more preferably from about 10–20% by weight) and from about 0.1–25% by weight zinc (more preferably from about 10–20% by weight). Where aluminum and zinc are used, it is preferred that at least one of these components be present at a level of about 0.1–10% by weight.

The metal products of the invention are in particulate form, and generally the smallest average particle sizes are preferred (typically around 400 mesh), although sizes up to small chips may be employed. The most preferred powders are in the form of foundry dust from milling or grinding operations, and have an average particle size approximately that of the corresponding pyrotechnic particles ±50%.

In order to generate the desired exothermic reaction, the metal components should be contacted with water and an alkali metal salt, particularly sodium chloride. Where dry compositions are made, the salt may be incorporated directly into the metal ingredients. In such a case, the salt is normally used at a level of from about 0.01–10% by weight, more preferably from about 0.01–2% by weight. Where faster initiation of the exothermic reaction is desired, a minor amount of elemental iodine may be added to the compositions or present along with the salt during the reaction; the iodine is typically used at a level of up to about 5% by weight based upon the weight of the composition.

In one particularly preferred class of compositions, a ball-milled mixture containing from about 10–25% by weight powdered elemental magnesium, from about 35–45% by weight powdered elemental iron is prepared and mixed with from about 0.01–2% by weight sodium chloride, with the balance of the composition being made up of approximately one-half each of powdered elemental aluminum and powdered elemental zinc.

The compositions of the invention may be used directly or can be supported in containers or a synthetic resin matrix. For example, the compositions may be placed in liquid pervious bags for ease of use. Alternately, a self-sustaining body comprising the metal composition interspersed and held within a synthetic resin matrix may be prepared.

DETAILED DESCRIPTION OF THE PREFERRED EMBODIMENT

The following examples describe preferred metallic compositions in accordance with the invention and methods of use thereof. It is to be understood, however, that these examples are provided by way of illustration only and nothing therein should be taken as a limitation upon the overall scope of the invention.

Although the invention can be implemented using a number of different compositions, the presently most preferred composition for general use in heat generation and degrading of unwanted substances is made up of about 13% by weight magnesium foundry dust particles, about 40% by weight iron foundry dust particles, a minor amount up to about 1% by weight sodium chloride, with the balance of the composition being made up of one-half aluminum foundry dust particles and one-half zinc foundry dust particles. Such dust particles typically have an average particle size close to that of the corresponding pyrotechnic grade particles, ±50%. In those instances where rapid initiation of the exothermic reaction is desirable, a small amount of crystalline elemental iodine may be added, typically up to about 2% by weight of the composition.

The compositions of the invention are preferably prepared by ball milling the selected metal particles to achieve a substantially homogenous mixture having substantially similar particle sizes. During such ball milling, it is not advisable to add the sodium chloride or other alkali metal salt, and also to avoid the introduction of water. In those compositions containing sodium chloride or other salt, the latter should be added after ball milling of the powdered metallic ingredients.

The compositions may be used in a variety of ways. For example, they can be added directly to an aqueous system to be thermally degraded, without any additional ingredients. An alternative would be to form a self-sustaining body comprising one of the selected metal compositions interspersed and held within a synthetic resin matrix. For example, good results have been obtained by first preparing a molten synthetic resin material (e.g., a polyalkylene such as polypropylene), followed by mixing in the previously prepared metal powder composition (advantageously without the addition of any salt) to assure homogeneity. At this point, the mixture can be poured into a pan or other form and allowed to cure and dry. Generally speaking, the body should have up to about 5% by weight of the matrix (more preferably up to about 2%), and up to about 95% by weight of the metal powder composition (more preferably up to about 98%. Although a variety of sizes and shapes can be formed in this manner, good results have been obtained with elongated sheets having a thickness of from about ⅛–1 inch, and more preferably from about ¼–⅜ inch. Such sheets or other self-sustaining bodies are used by placing the same in an aqueous system with the salt. This causes immediate generation of heat which melts the synthetic resin matrix and allows thermal degradation of unwanted substances.

In other forms of the invention, the metallic compositions may be placed in a water-permeable container, such as a flexible fiberglass bag. This makes the compositions much easier to handle, and allows retrieval of the remnants of the bags after use thereof.

An incident of use of the compositions of the invention is the generation of copious quantities of hydrogen gas. In large scale operations using the compositions, this hydrogen gas can be recovered and used as a fuel.

In one test, a powdered composition was prepared by ball milling a mixture containing 90–95% by weight elemental iron foundry dust, 3–5% by weight elemental magnesium foundry dust, 4% by weight zinc particles, and about 1–5% by weight elemental aluminum foundry dust. After ball milling, about 1% by weight sodium chloride was added and mixed thoroughly into the metal powder. Thereupon, the powder was placed in large porous fiberglass bags (40 pounds of composition per bag). These bags were used in a system designed for the treatment of swine manure.

Specifically, a series of three treatment cells were constructed each formed of an 8 foot long semicircular plastic body having a diameter of 24 inches, end walls and a lid; the lid had a vent which opened at 20 psi. The plastic body was also equipped with an elongated central, apertured pipe which extended through the end walls. Four of the composition-filled fiberglass bags were placed below the apertured pipe in each cell, and four above. The three cells were interconnected in parallel relationship to a final treatment vessel in the form of a large 200 barrel oil field tank.

The oil field tank had a 2 inch deep layer of the described composition therein (approximately 800 pounds) . The tank was also equipped with a gas-tight cover equipped with a pop off valve set at 40 psi.

In the test, volumes of aqueous swine manure were passed through the three cells and to the final treatment tank. In the treatment cells, the temperature quickly rose to around 512° F., and was maintained at this level during passage of manure therethrough and then slowly decreased as the composition was consumed. Once the temperature fell below about 300° F., the cell was deemed essentially spent, and was recharged with additional bags of the composition. During treatment in the cells, steam and hydrogen gas was evolved and vented to the atmosphere. The effluent from each cell was directed to the final tank where it was finally treated, again involving evolution of considerable gas. The temperature in the final tank was below 300° F. The final product remaining in the tank after the thermal degradation was in the form of a ash-like powder of very small volume as compared with the original volume of manure (ash volume estimated to be around 3% of the original manure volume).

In a similar fashion, a variety of products can be thermally degraded using the compositions of the invention. These include all types of alcohol products, blood, petroleum products (e.g., crude or refined oils) and polychlorinated biphenols. The temperature of reaction generated during degradation of these products is variable, with blood urine temperatures typically ranging from about 500–550° F., whereas the other products are typically from 300–400° F.

I claim:

1. A method comprising the steps of:

providing in a reaction container a composition including respective quantities of particulate elemental magnesium, particulate elemental iron, an additional elemental metal selected from the group consisting of particulate elemental aluminum and particulate elemental zinc at a level of from about 1–10% by weight, an alkali metal salt and water;

causing said composition to react in said container to generate hydrogen gas; and recovering said evolved hydrogen gas.

2. The method of claim 1, including the step of using said recovered hydrogen gas as a fuel.

3. The method of claim 1, said composition including from about 0.01–10% by weight sodium chloride.

4. The method of claim 1, said container comprising a synthetic resin body.

5. The method of claim 1, said container being water permeable.

6. The method of claim 1, said composition including from about 10–50% by weight iron and from about 4–90% by weight magnesium.

7. The method of claim 6, said composition comprising from about 10–25% by weight magnesium and from about 35–45% by iron.

8. The method of claim 1, said iron and magnesium being present as powders.

9. The method of claim 8, said powders being approximately the size of pyrotechnic particles.

* * * * *